(12) United States Patent
Le Boulicaut

(10) Patent No.: US 9,260,193 B2
(45) Date of Patent: Feb. 16, 2016

(54) COMPOSITE BEAM FOR TURBOJET ENGINE NACELLE SUPPORT STRUCTURE

(71) Applicant: AIRCELLE, Gonfreville l'Orcher (FR)

(72) Inventor: Loic Le Boulicaut, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 0 days.

(21) Appl. No.: 14/170,982

(22) Filed: Feb. 3, 2014

(65) Prior Publication Data

US 2014/0145060 A1 May 29, 2014

Related U.S. Application Data

(63) Continuation of application No. PCT/FR2012/051582, filed on Jul. 5, 2012.

(30) Foreign Application Priority Data

Aug. 3, 2011 (FR) ...................................... 11 57108

(51) Int. Cl.
*B64C 7/02* (2006.01)
*B64D 29/06* (2006.01)
*B64D 27/26* (2006.01)

(52) U.S. Cl.
CPC ................ *B64D 29/06* (2013.01); *B64D 27/26* (2013.01); *B64D 2027/264* (2013.01)

(58) Field of Classification Search
USPC ........... 248/554; 244/110 B, 117 R; 60/226.2
See application file for complete search history.

(56) References Cited

U.S. PATENT DOCUMENTS

| 5,239,822 | A | 8/1993 | Buchacher |
| 8,726,634 | B2* | 5/2014 | Vauchel et al. ............. 60/226.2 |
| 2003/0024236 | A1* | 2/2003 | Lymons et al. ............. 60/226.2 |
| 2005/0082423 | A1* | 4/2005 | Whitmer et al. ................ 244/54 |
| 2008/0251634 | A1* | 10/2008 | Bernardi et al. ................ 244/54 |
| 2010/0064660 | A1* | 3/2010 | Vauchel et al. ............. 60/226.2 |
| 2010/0155566 | A1* | 6/2010 | Linz ............................. 248/554 |
| 2010/0170985 | A1* | 7/2010 | Flood ........................ 244/117 R |
| 2012/0097761 | A1* | 4/2012 | Vache et al. ............. 239/265.19 |
| 2012/0248284 | A1* | 10/2012 | Bellanger et al. ............. 248/554 |
| 2013/0062461 | A1* | 3/2013 | Bellanger et al. ............. 244/54 |
| 2013/0062462 | A1* | 3/2013 | Bellanger et al. ............. 244/54 |
| 2013/0119191 | A1* | 5/2013 | Wolfe et al. .................... 244/54 |
| 2013/0161415 | A1* | 6/2013 | Bellanger et al. ........ 239/265.19 |
| 2014/0116024 | A1* | 5/2014 | Channel ..................... 60/226.2 |

FOREIGN PATENT DOCUMENTS

| FR | 2 920 192 | 2/2009 |
| WO | 2011/073551 A1 | 6/2011 |
| WO | 2011/135213 A1 | 11/2011 |

OTHER PUBLICATIONS

International Search Report issued Feb. 5, 2013 in International Application No. PCT/FR2012/051582.

\* cited by examiner

*Primary Examiner* — Bradley Duckworth
(74) *Attorney, Agent, or Firm* — Brinks Gilson & Lione

(57) ABSTRACT

A longitudinal beam for a turbojet engine nacelle support structure is provided. The longitudinal beam is primarily made from composite materials and in the shape of an L and includes a longitudinal web contacting with an attachment pylon of the nacelle and a sole. More specifically, the sole produces a receiving part capable of cooperating directly or indirectly by embedding with an end of an associated front frame.

8 Claims, 5 Drawing Sheets

COMPOSITE BEAM FOR TURBOJET ENGINE NACELLE SUPPORT STRUCTURE

CROSS-REFERENCE TO RELATED APPLICATIONS

This application is a continuation of International Application No. PCT/FR2012/051582, filed on Jul. 5, 2012, which claims the benefit of FR 11/57108, filed on Aug. 3, 2011. The disclosures of the above applications are incorporated herein by reference.

FIELD

The present disclosure relates to the field of nacelles for aircraft engines, and more specifically to a support structure for a thrust reverser.

BACKGROUND

The statements in this section merely provide background information related to the present disclosure and may not constitute prior art.

As is known in itself, an aircraft engine, 17 as illustrated in FIG. 8, which is generally of the turbojet engine type, is placed inside a nacelle 7 which, among other functions:

provides an aerodynamic fairing for the engine,
makes it possible to channel the outside air toward the engine,
makes it possible to connect the engine to the aircraft.

Traditionally, a cascade thrust reverser comprises two half-cowls 19 each slidingly mounted on a longitudinal support half-beam called the 12 o'clock beam 1 generally pivotably mounted on a support mast of the nacelle.

The rotational movement of each half-beam on the nacelle support thus makes it possible to pivot each half-cowl 19 relative to that mast 13 for maintenance operations.

A lower support beam also exists called the 6 o'clock beam 5 comprising two half-beams capable of opening by pivoting with the half-cowls 19 and therefore generally equipped with means for connecting to each other and locking the two half-structures.

Each 6 o'clock half-beam 5 is traditionally connected to the corresponding 12 o'clock 1 half-beam by means of an inner structure surrounding the turbojet engine 17.

Depending on the design of the nacelle, the 12 o'clock beam may be stationary and the opening of the half-cowls for maintenance purposes may be done by completely translating said sliding cowls. In that case, it is also possible to provide a single substantially peripheral moving cowl, in which case the 6 o'clock beam is then no longer present.

The support structures or beams are generally also equipped with guide rails allowing each half-cowl to slide on its associated half-beam alternating between a thrust reverser position called the direct jet position and a thrust reverser position called the reverse jet position.

Thus, traditionally, each 12 o'clock half-beam will have a structure, on its outer face, of primary and secondary rails able to allow the movement of the associated half-cowl 19, and multiple hinge yokes capable of allowing the half-beam to be articulated on the associated nacelle mast.

The 12 o'clock and 6 o'clock beams are connected to each other by a substantially annular structure called the front frame and generally formed by two front half-frames 3 each extending between said corresponding half-beams on either side of the middle plane of the nacelle.

This front frame is designed to be fastened to the periphery of the downstream edge of a casing of the fan of the engine 17, and thereby to contribute to the reaction and transmission of forces between the different parts of the nacelle 7 and the turbojet engine 17.

Furthermore, in the case of a nacelle equipped with a cascade thrust reverser device, the front frame also serves to support said vanes of the thrust reverser.

The connection of each 12 o'clock-beam with its associated front frame part is done by means of a mounted or integrated extension (for example, see document FR 2,920,192) on the upstream part (relative to the direction of airflow in the nacelle) of the half-beam, and intended to cooperate by snapping with a corresponding receptacle of the front frame. This receptacle of the front frame is traditionally called "ash pan".

Once this snapping is done, rivets are fastened to secure the extension of the beam with the wall of the front half-frame.

The 6 o'clock half-beams have substantially the same structure, with the exception that they do not comprise hinge yokes, but locking yokes and/or corresponding locking means.

Such an assembly method is not fully satisfactory, on the one hand because it only allows forces to pass over part of its section, and on the other hand because the fasteners, for example rivets, are mounted blind (i.e., they are only accessible from the outside), which makes them complicated to assemble and monitor.

In particular, by using such an assembly method, the working junction area substantially represents only half of the total height of the assembly.

Furthermore, the more frequent use of composite materials, in particular to produce part or all of said beams and/or front frame, raises issues regarding the relative orientation and the continuity of the fibers of the materials relative to one another so as to optimize the passages of forces and strength.

Various applications have sought to provide solutions to these drawbacks. Examples in particular include published PCT application WO/2011/135213.

WO/2011/135213 targets a support half-structure for an aircraft engine nacelle, comprising at least one longitudinal beam and one front half-frame, remarkable in that said beam and said half-frames are made from composite materials, in the said front half-frame has an open section, and in that said beam and said front half-frame form a single piece.

By producing a single-piece part in a single molding operation (using known RTM (Resin Transfer Molding) or infusion techniques, for example), continuity of the fibers of the composite materials is obtained, between the beam and its associated front half-frame: in this way, improved transmission of forces between those two members is obtained.

By placing the fibers in an optimized way (in the direction in which the forces pass), mass savings are achieved relative to an aluminum block.

Furthermore, in the case of such a single-piece part, no fastening means between the members are of course necessary, which makes it possible to eliminate the aforementioned assembly and monitoring problems.

The invention also makes it possible to move the junction between the beam and its associated front half-frame further away from the very charged transition zone between the (substantially vertical) 12 o'clock web of the beam and its front half-frame, by lengthening the extension of the beam (or the front half-frame, depending on the considered alternative).

According to one method for manufacturing a single-piece integrated front frame beam, this assembly is designed so as to be configurable from subassemblies assembled together to form a preform before polymerization and final treatment, thereby making the part a single piece.

More particularly, the beam structure substantially forms an L comprising a longitudinal web and a sole generally in the shape of an omega.

The front frame is integrated into a web and is attached on the structure of the beam at one upstream lateral end of the omega-shaped floor by means of right-angled returns glued to the beam structure. This same web will also be assembled by fastening as well as with a connecting flange connecting the front frame to the fan casing.

In general, many subassemblies are assembled using right-angled end returns.

At these connections, and in particular therefore at the web that is connected to the front frame transmits the forces from said front frame directly to the mast, in particular using an upstream connecting yoke; the forces therefore follow a transmission line in which the carbon fibers are curved at 90°. Such force transmission lines are not optimal.

The front frame creates torsion and traction forces on the beam. Currently, the forces pass through perpendicular webs.

The flange for connecting to the fan casing creates a significant traction force on the beam. Currently, the forces pass through perpendicular webs, and only through the omega-shaped floor of the beam.

Thus, it appears that the sole criterion of continuity of the fibers was not sufficient and that it was necessary to be able to still further improve the transmission of forces within such a nacelle support structure.

SUMMARY

To that end, the present disclosure provides a longitudinal beam for a turbojet engine nacelle support structure, said beam being primarily made from a composite material and being substantially in the shape of an L comprising at least one longitudinal web designed to come into contact with the attachment pylon of the nacelle on the one hand, and at least one sole on the other hand, characterized in that the sole is configured so as to produce at least one receiving part capable of cooperating directly or indirectly, by embedding, with at least one end of the associated front frame.

Thus, by directly configuring the beam, and in particular its sole, to at least partially form the equivalent of a junction ash pan with the front frame, the fibers of the composite material participate fully in reacting forces. Furthermore, the fibers of the material may be configured gradually with gentle slopes and curves, thereby avoiding the significant and sudden folds of the fibers along the force passage pathways.

Advantageously, the sole of the beam has a ceiling and a floor.

According to a first form, the receiving part has a hollow shape, called female, capable of cooperating with a so-called corresponding male shape of the front half-frame.

According to a second form, the receiving part has a so-called male shape capable of cooperating with a corresponding so-called female shape of the front half-frame.

Advantageously, the receiving part integrates an ash pan capable of receiving the corresponding part of the front frame. It is in fact possible to provide an intermediate part around which the receiving part of the beam will be configured.

Additionally, the receiving part is capable of receiving complementary fastenings between the beam and the front frame.

In one form, the receiving part has a polygonal section. It is also possible to produce a substantially circular section, but such a section will be less suitable for reacting force moments.

In another form, it is a 12 o'clock beam.

It should be noted that although the present disclosure mentions a front frame, this term is above all used to designate the corresponding structure. It is in particular also applicable to a cascade vane rear frame.

The present disclosure also relates to a supporting half-structure for an aircraft engine nacelle comprising at least one longitudinal beam and one front half-frame, characterized in that the beam is a beam according to the present disclosure.

Advantageously, the beam and the front frame are connected by embedding in the receiving part before final polymerization of the composite materials so as to form a single-piece half-structure.

Also advantageously, the half-structure comprises a 12 o'clock beam and/or a 6 o'clock beam according to any one of claims 1 to 7, a front frame and/or a rear vane frame as well as connecting reinforcements between the rear frame and the front frame, the front frame and/or the rear frame being connected by embedding in the receiving part of the beams before final polymerization of the composite materials so as to form a single-piece half-structure.

The reinforcements will generally have a geometry suited to the forces between the front frame and the rear vane support frame and may be added (before or after polymerization) to improve the strength of the structure thus created. These reinforcements may be installed at the reverser opening actuators and/or between the vanes. These reinforcements could have an aerodynamic shape so as not to hinder the airflow in reverse operation. It becomes possible to integrate the rear frame if the material of the vanes and the half-structure has the same expansion coefficient.

The present disclosure lastly relates to a nacelle for an aircraft engine, characterized in that it comprises at least one structure according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
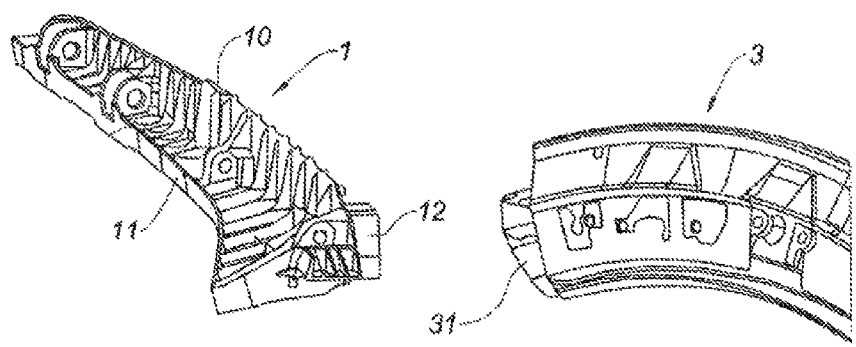
FIG. 1 is a diagrammatic illustration of a connection between a beam and a front frame according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
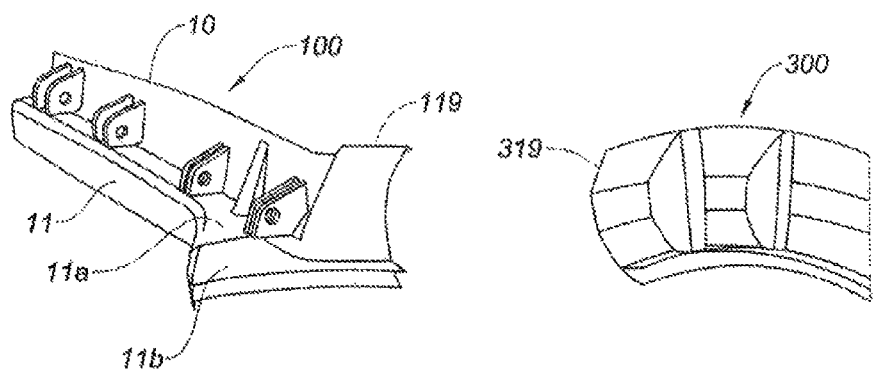
FIG. 2 is a diagrammatic illustration of a connection between the beam and the front frame made from a composite material according to a first improvement and described in application WO/2011/135213.

FIGS. 1 and 2 relate to elements of the state of the art.

Generally and as previously described, a traditional configuration of the support structure of a downstream thrust reverser section of a turbojet engine nacelle 7 comprises:

- two 12 o'clock beams 1 positioned on either side of a pylon 13 for attaching the nacelle to a wing of an aircraft, and
- two front half-frames 3, respectively connected to the two 12 o'clock beams 1, and coming together in the lower part at the two 6 o'clock beams 5 connected to each other by the connecting means.

As mentioned, in the case of a structure opening longitudinally for maintenance purposes, the two front half-frames then only form a single unitary front frame and the 6 o'clock beams are eliminated.

The beams as well as the front frame therefore form the support structure intended to support the cascade vanes as well as the moving cowls of the thrust reverser device.

FIG. 1 illustrates the assembly of a 12 o'clock beam 1 with its front half-frame 3 according to the prior art. According to the prior art, these elements are primarily made from an aluminum structure.

In general, the 12 o'clock beam has an L-shaped structure having a longitudinal web 10 designed to be fastened on the attachment pylon and a sole 11.

The front half-frame 3 has a partially annular shape having a substantially C-shaped section and is equipped with a front frame box 31.

As shown in FIG. 1, the connection of the 12 o'clock beam 12 to the front half-frame 3 is done traditionally by providing an extension 12, called an ash pan that snaps inside the cavity of the front frame box 31 with a corresponding shape.

Once this snapping is done, fasteners (not shown) are fastened to secure the extension 12 of the beam 1 with the wall of the front frame box 31.

As mentioned, such an assembly method is not fully satisfactory, on the one hand because it only allows forces to pass over part of its section, and on the other hand because the rivets are mounted blind (i.e., they are only accessible from the outside), which makes them complicated to assemble and monitor. Such an assembly method also requires a very long calibration operation (machining of shims that are sometimes biased), which is therefore costly.

The improvement covered by application WO/2011/135213 is shown in FIG. 2. In this form, the composite beam has a sole 11 with an omega-shaped structure comprising a ceiling 11a and a floor 11b.

In this configuration, a beam 100 made from a composite material is assembled to a front frame 300 also made from a composite material no longer comprising a front frame body 31.

The connection between the beam 100 and the front frame 300 is done by overlapping between a transition zone 119 of the beam with an open section and a corresponding transition zone 319, also with an open section, of the front frame. The connection is done by gluing or riveting. The assembly may be made in a single piece by assembly before final polymerization of the composite material.

The transition zone 119 formed in a single piece with the 12 o'clock beam 100 and the front half-frame 300 makes it possible to go from the L-shaped section to the C-shaped section thereof. The transition is, however, done by imposing a 90° curve on the fibers of the composite material, which is not optimal in terms of transmitting forces along the fibers.

Figure 3:
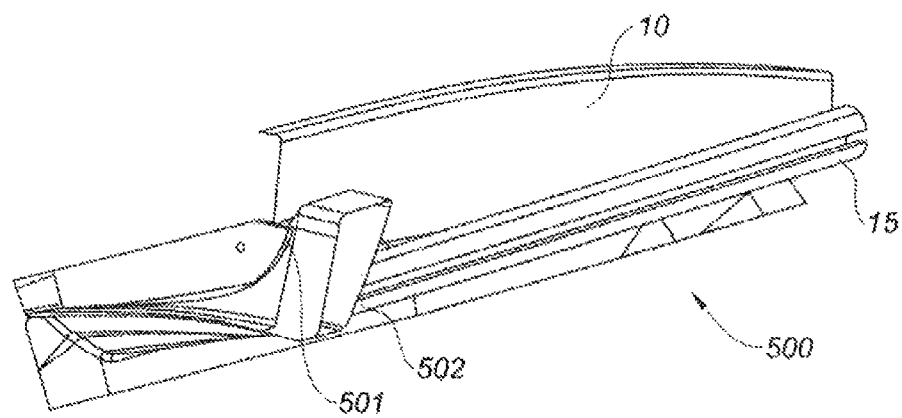
FIGS. 3 and 4 are front and rear perspective views, respectively, of a beam according to the present disclosure.
Figure 4:
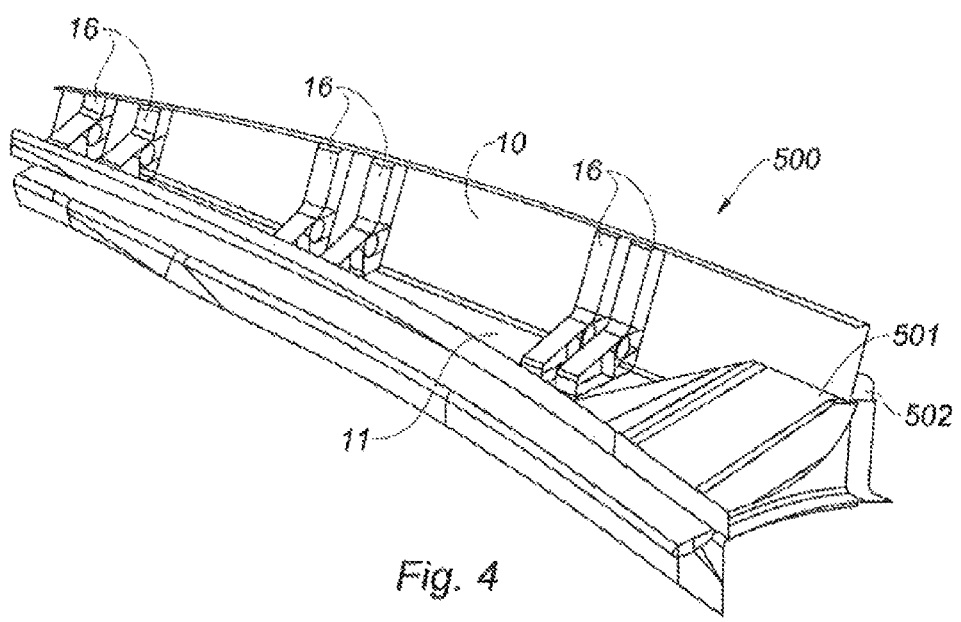
Figure 5:
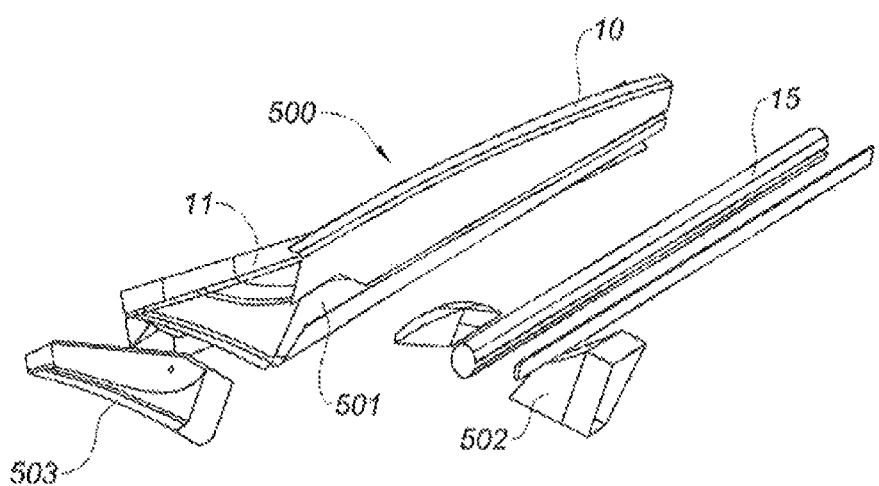
FIG. 5 is an exploded view of the component elements of the beam of FIGS. 3 and 4.

A beam 500 according to the present disclosure is shown in FIGS. 3 to 5. Traditionally, this beam 500 has an L-shaped structure comprising a longitudinal web 10 equipped with a longitudinal guide rail 15 for guiding a moving thrust reverser cowl on the one hand, and a sole 11 on the other hand. Longitudinal reinforcements 16, which may serve as hinge yokes, are positioned regularly along the beam between the web 10 and the sole 11.

This beam is primarily made from a composite material.

According to the present disclosure, the sole 11 of the beam is configured so as to produce at least one receiving part 501 capable of cooperating directly or indirectly by embedding with at least one end of the associated front frame.

More specifically, the sole is configured to recreate an ash pan shape intended to receive the front frame.

This allows the fibers to be gradual deformed towards the desired shape.

FIG. 5 is an exploded illustration of the different component elements of the beam 500. Each element constitutes a preform assembled with the other elements before final polymerization of the composite beam 500.

As shown in FIG. 5, the receiving part 501 receives an interface ash pan 502 forming a protuberance to receive the front frame, which will then have a corresponding hollow open shape. Traditional fasteners, for example of the rivet type, will provide the connection between the two structures.

An extension 503 may also be provided to close the sole 11 of the beam and provide partial overlapping with a corresponding end of the front frame so as to still further strengthen the connection.

This extension 503 may in particular serve as a direct connection for connecting the beam to a flanging system with the fan casing, commonly called a J-ring. Thus, the sole, and more specifically the floor and the ceiling of the sole of the beam 500, are connected to said J-ring in the continuation of the front frame, which makes it possible to transmit forces directly through the beam 500.

The extension 503 may also receive the axis of a connecting rod for the connection between the two 12 o'clock beams.

Alternatively, it is possible to provide that the receiving part 501 has a hollow so-called female shape, capable of cooperating with a corresponding so-called male shape of the front half-frame.

It is also possible to provide that the embedding is done before final polymerization of the beam 500 and the front frame, thereby making it possible to obtain a single-piece assembly. The junction may be done by gluing, sewing, etc. before final polymerization. In that case, it is of course no longer necessary to use rivets for the fastening.

This embedding allows a less flexible junction than an L-shaped overlapping junction as previously described and consequently allows better reaction and transmission of forces. Furthermore, the fibers are not harshly bent at 90°.

In one form, the receiving part and the embedding will be done using a shape with a polygonal section.

Figures 6, 7:
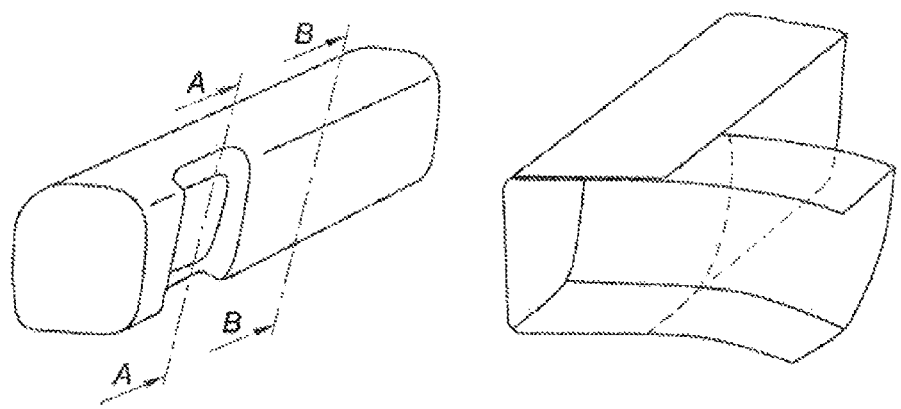
FIGS. 6 and 7 are block diagrams of alternative forms for a beam with a closed section and a beam with an open section, respectively.
Figure 8:
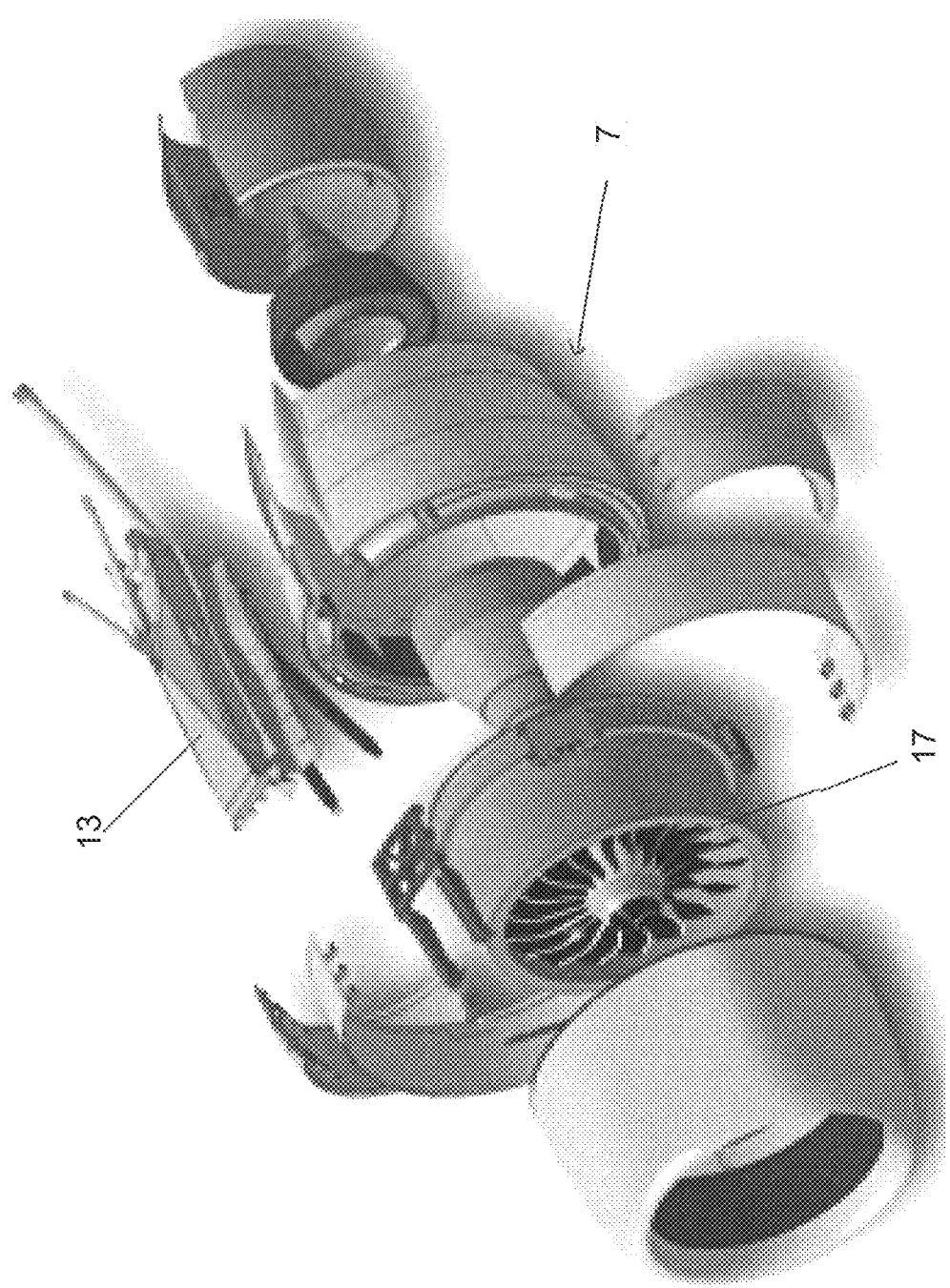
FIG. 8 is a perspective view of a prior art engine nacelle.
Figure 9:
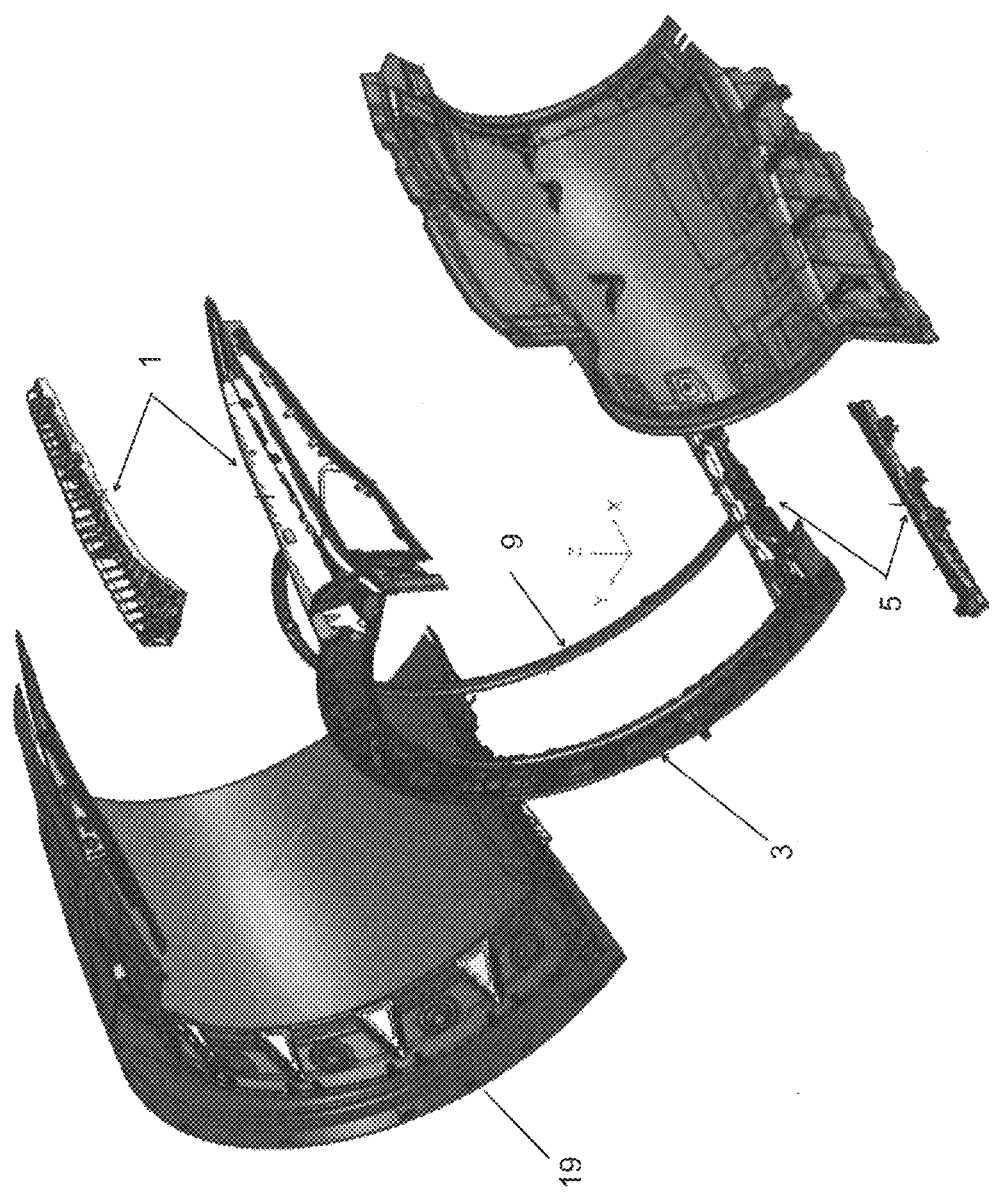
FIG. 9 is a perspective view of a prior art thrust reverser structure.

FIG. 6 is a block diagram of a beam with a closed section having a hollow receiving part obtained by local deformation whereof the geometry will be suitable for properly reacting the forces, in particular by drawing, in particular able to receive an intermediate receiving part of the ash pan type as previously described. The rear vane frame 9 may have a shape that can be integrated into the hollow shape directly without adding an ash pan. The assembly may be made in a single piece by assembly before final polymerization of the composite material.

This type of formation may be used to fasten a rear vane frame.

FIG. 7 is a block diagram of a beam with a closed section having a hollow receiving part obtained by cutting. A female shape of the beam is installed in the continuation of the front frame to be assembled by gluing and/or sewing.

Although the present disclosure has been described with one particular form, it is of course in no way limited thereto and comprises all technical equivalents of the described means as well as combinations thereof if they are within the scope of the present disclosure.

What is claimed is:

1. A longitudinal beam being made from a composite material and being in the shape of an L, the longitudinal beam comprising:
    at least one longitudinal web extending along one edge of the longitudinal beam
    at least one sole on which the at least one longitudinal web is fastened along an edge of the sole and
    at least one hinge yoke positioned along the beam between the web and the sole,
    wherein the sole forms at an end at least one receiving part in a form of an open space formed by a ceiling of the sole tapering down in a longitudinal direction of the beam to a floor of the sole, and the receiving part is open toward an opposite side relative to said at least one hinge yoke, and wherein an interface of an ash pan is inserted into the open space of the receiving part.

2. The longitudinal beam according to claim 1, wherein the ash pan receives a corresponding male shape of a front half-frame.

3. The longitudinal beam according to claim 1, wherein the receiving part has a polygonal section.

4. The longitudinal beam according to claim 1, wherein the longitudinal beam is a 12 o'clock beam.

5. A supporting half-structure for an aircraft engine nacelle comprising at least one front half-frame and the longitudinal beam configured to receive the front half-frame via the ash pan according to claim 1.

6. The supporting half-structure according to claim 5, wherein the longitudinal beam and the front half-frame form a connection by the receiving part, and the connection is processed through an embedding step before final polymerization of the composite material so as to form a single-piece half-structure.

7. The supporting half-structure according to claim 6, wherein the supporting half-structure comprises a 12 o'clock beam which comprises the longitudinal beam, a rear vane frame, and connecting reinforcements between the rear vane frame and the front half-frame, the front half-frame and/or the rear vane frame being connected to the 12 o'clock beam by the embedding step before final polymerization of the composite material so as to form a single-piece half-structure.

8. A nacelle for an aircraft engine, wherein the nacelle comprises at least one supporting half-structure according to claim 5.

\* \* \* \* \*